Dec. 12, 1972  C. M. CASON III  3,706,050

MAGNETOHYDRODYNAMIC GAS DYNAMIC LASER

Filed Nov. 2, 1971

| CURVE | PRESSURE |
|---|---|
| A | = $7.6 \times 10^2$ TORR |
| B | = $4.0 \times 10^3$ TORR |
| C | = $7.6 \times 10^3$ TORR |
| D | = $1.52 \times 10^4$ TORR |

RADIATION FREQUENCY IN CYCLES PER SEC.

Charles M. Cason III,
INVENTOR

BY

United States Patent Office 3,706,050
Patented Dec. 12, 1972

3,706,050
MAGNETOHYDRODYNAMIC GAS DYNAMIC LASER
Charles M. Cason III, Huntsville, Ala., assignor to the United States of America as represented by the Secretary of the Army
Filed Nov. 2, 1971, Ser. No. 194,961
Int. Cl. H01s 3/09
U.S. Cl. 331—94.5     5 Claims

ABSTRACT OF THE DISCLOSURE

A pulsed gas laser utilizes continuously expanding gases that pass through the lasing chamber and subsequently generate a direct current, pulsed electric output which is fed back to stimulate laser emission. A conventional gas burner and nozzle assembly couple flowing gases into a standard laser cavity. Gases leaving the laser cavity pass between poles of an MHD magnet, generating output electric power which is transformed into high voltage pulses of output power. An alkali metal component is introduced into the system before the flowing gases reach the MHD magnet for increasing electrical conductivity of the gas therein and thereby enhancing large pulses of electrical energy feedback for stimulating additional laser action.

BACKGROUND OF THE INVENTION

In creating gaseous lasing action through population inversion, the pumping gas tends to raise the energy state of the laser gas above the ground state to a desired excited state prior to lasing. In an electro-adiabatic gas laser, population of the laser levels is supplied by proportions of electric discharge, chemical combustion and gas dynamic expansion processes. Electric pumping of a lasing gas may be readily achieved by periodically discharging high voltage pulses therethrough, as from a capacitor bank. In chemical pumping, the laser and pumping gases interact in common mixing and lasing chambers, providing continuous population inversion of energy levels. In gas dynamic pumping, the energy is frozen in the upper laser levels by rapid expansion. Prior to mixing, the gases are maintained at separate individual temperatures. Extremely rapid temperature changes produce a population inversion during combination of the gases, as is well known in the art.

A gas laser in which pumping is achieved by nozzle expansion of a pumping gas with a laser or active gas and which utilizes self-induced electron stimulation is disclosed in Pat. No. 3,621,461 issued to Cason et al. Nov. 16, 1971 and entitled "Self-Pumped Electro-Adiabatic Laser." Cason et al. disclose the laser and pumping gases to be brought together in a mixing chamber with a suitable electron releasing agent for producing additional free electrons. The combined gases expand through a nozzle into an electric stimulation region where electric current flow is derived from the interacting, flowing gases passing through a magnetic field. This electric energy is utilized to further stimulate the flowing gases prior to entry of the gases into the actual laser cavity. The laser energy is then coupled from the laser cavity by conventional means.

SUMMARY OF THE INVENTION

The present invention is an improved gas laser wherein electro-adiabatic pumping of the laser gas is by nozzle expansion of the gases and self-generated electron pulse discharge through the gases in the laser chamber. Laser, dissociated halogens, and pumping gases are brought together in a conventional gas dynamic laser (GDL) burner and expanded through a nozzle assembly to a standard laser cavity having feedback and output coupled mirrors. A magnetohydrodynamic (MHD) generator having a magnet and electrode assembly adjacent the channeled, flowing gases generates electric energy in response to the ionized gases exhausted from the laser cavity. The electric energy is converted to pulses of high voltage which is fed back to the laser cavity for periodically pulsing the laser. Alkali metal compounds are introduced into the flowing gas downstream of the laser cavity to provide easily ionizable composition for releasing additional electrons prior to passage of the gas across the MHD magnet. Cold laser gas and $H_2$ molecules are additionally introduced into the flow just prior to gas entering the laser cavity. Thus, pumping is enhanced by the additional chemical reaction between gases entering the laser cavity, vibrational energy transfer, and by the high voltage pulses generated from the exhausting ionized gases.

An object of the present invention is to enhance operational efficiency of a gas dynamic laser by providing an increased supply of deactivated lower level laser molecules just prior to the laser cavity entrance.

Another object of the present invention is to provide chemical boosting of the laser output energy.

A further object of the present invention is to boost the electrical conductivity of the magnetohydrodynamic working fluid and gases by injection of electron releasing agents into the flowing fluid.

DESCRIPTION OF THE PREFERRED EMBODIMENT

Figure 1:
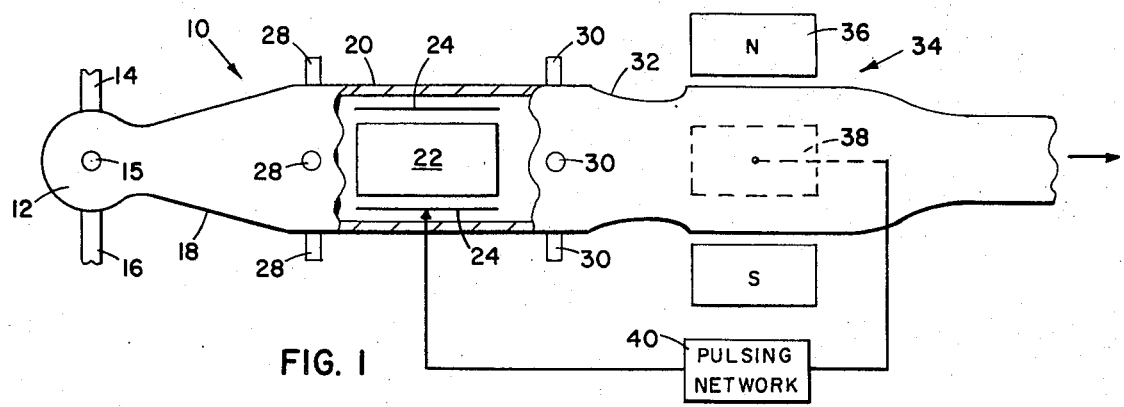
FIG. 1 is a preferred embodiment of the improved gas dynamic laser, wherein extraneous structure is omitted.

A preferred embodiment of the invention is as disclosed in FIG. 1. A laser 10 has a conventional chemical combustor 12 or burner having input ports 14, 15 and 16 for introducing a fuel, oxidizer and a halogen to provide laser molecules ($CO_2$), pumping gas ($N_2$), and heat and dissociated halogens (F or Cl) respectively therethrough. However, the pumping gas and dissociated halogens can be introduced through the same port. The gases, combined in burner 12, expand and exhaust rapidly through nozzle 18. The gases flow through a standard laser cavity 20 having feedback and output coupled mirrors 22 (one mirror not shown), wherein lasing action from energy stored and being transferred into the laser gases occurs. Thermally liberated electrons, reelased by the flowing gas, further enhance laser level excitation in cavity 20. A nozzle array 28 provides for introduction of cold laser molecules into the flowing gas just prior to entry thereof into cavity 20. Gain is proportional to the number of laser molecules in the inverted state which is controlled by the number of laser molecules present. Losses from laser levels are also proportional to the inverted state density. A large inverted state density in the expansion nozzle is detrimental because of deactivation losses and must be kept low. This is done by minimizing the laser molecule density prior to injection at port 28. Hence, cold laser molecules introduced at port 28 enhance the gas dynamic laser performance. Chemical reactions within the flowing gases may also be enhanced by introducing hydrogen molecules through nozzle 28 to react with the frozen atomic halogen atoms giving excited HF or Hd and thereby boosting the laser energy within the laser cavity.

A nozzle array 30, downstream from the laser cavity provides for alkali metal compounds, such as cesium, sodium or potassium, to be introduced into the flowing gas. Because of their easily ionizable nature, these compounds greatly increase the electrical conductivity of the gas by adding to the electrons released therein. The increased electrical conductivity of the gas enhances generation of electrical energy to further pump the laser gas flowing through cavity 20. Being responsive to the electrical conductivity of the flowing gas, a convergent nozzle 32 compresses and heats the gas ionizing cesium. A magnetohydrodynamic (MHD) generator 34 has a magnet 36 aligned to produce a magnetic field across the path of the flowing gas and a segmented electrode assembly 38 responsive to the resultant electric field for providing output electric power. This output power is coupled to pulser circuit 40 and transformed to high voltage pulses of direct current power. Pulser circuit 40 may be a Marks-Bank system or other voltage amplifying system. These high voltage pulses are then coupled to laser cavity 20 and conventionally discharged through the lasing gas between electrodes 24. After passing through the magnetic field of MHD generator 34, the exhausting gas pressures are adjusted to near atmospheric pressure and exhausted to the atmosphere.

The electron density requirement for MHD generator 34 is higher than that of the laser cavity. Alkali atoms introduced prior to the laser cavity would tend to deactivate laser levels. However, the state of the laser molecules are not important within the MHD channel and it is operated at relatively high temperature whereas the laser channel is operated at relatively low temperature. The electrons required in the laser channel are frozen within the expansion processes of the nozzle. These electrons, although sufficient for laser excitation processes are not sufficient for MHD generation of power. The cesium or other alkali metal introduced in port 30 is ionized thermally by compression within nozzle 32 and will provide the high electron density required for MHD generation.

The level of pressure within laser cavity 20 determines the number of modes available for lasing under the pressure broadened gain curve. The pressure level in combustion chamber 12 can provide the desired pressure in chamber 20, allowing low translational temperature for efficient laser operation. For example, stagnation pressures in chamber 12 of the order of 100 atmospheres will yield approximately 10 atmospheres of pressure in the laser cavity, for a $CO_2$ laser. Similarly, for a carbon monoxide (CO) laser, 100 atmospheres of pressure in the plenum chamber affords approximately 0.1 atmosphere in the laser cavity, by proper expansion rate of nozzle 18.

The MHD-GDL can be operated as a mode locked system. Ordinary P branch vibrational-rotational transitions in $CO_2$ are spaced by an amount of $2k\theta r/h$ where $k$ is the Boltzman constant, $\theta r$ is the characteristic rotational temperature and $h$ is Planck's constant. For $CO_2$ this is $2.32 \times 10^{10}$ cps. At pressures above 20 torr, the $CO_2$ laser possesses a strongly collision-broadened gain bandwidth of the order of 4 mHz./torr. The frequency separation of the longitudinal modes of a laser cavity is $c/2L$ where $c$ is the speed of light and L is optical length. For example, with an L of 3 meters at 50 mHz. frequency separation exists between longitudinal modes.

Figure 2:
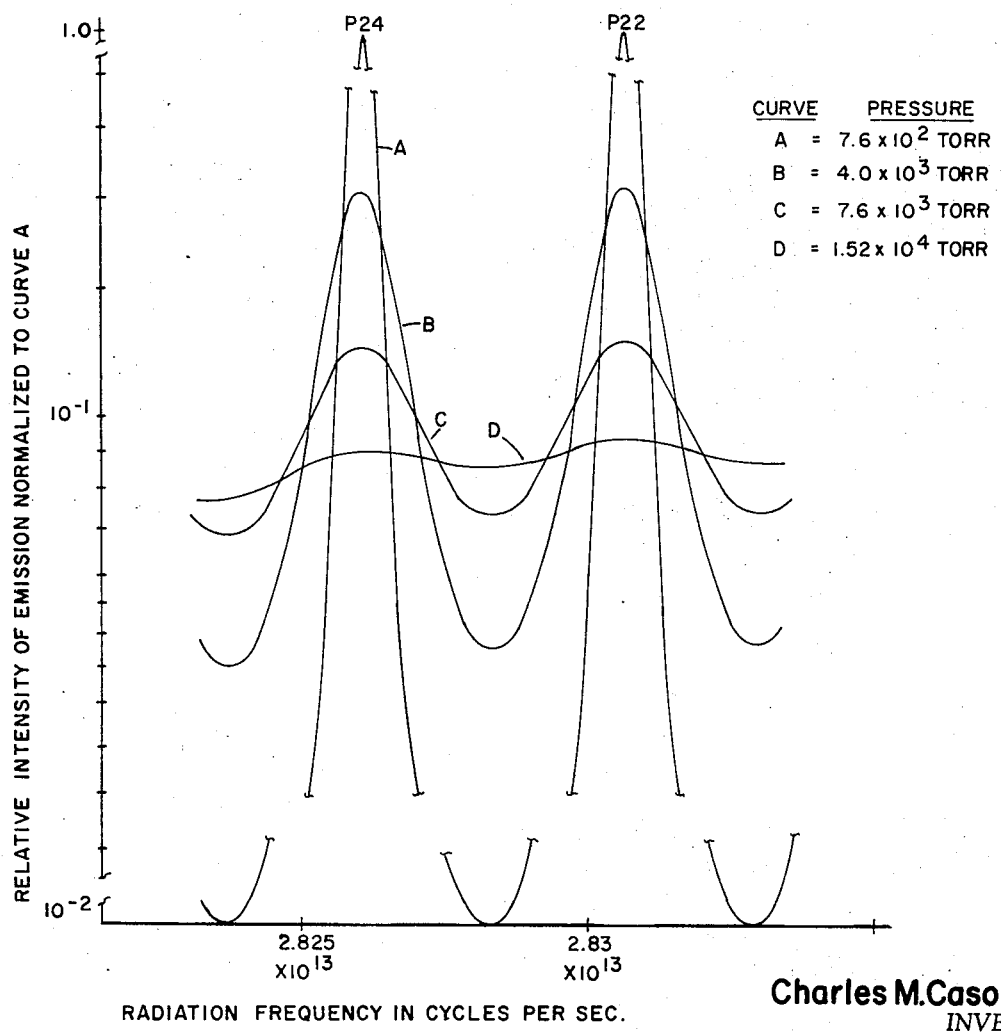
FIG. 2 is a semi-log graph of the gain spectral profile of the inventive gas dynamic laser showing effects of pressure thereon.

As the gas pressure is increased by adding non-laser molecules, the gain bandwidth broadens, as shown in FIG. 2. At approximately $5.8 \times 10^3$ torr or 7.6 atmospheres overlapping of the adjacent gain bandwidth curves becomes very important, as may be noted from the curves of FIG. 2. Typically, for transitions from P14 to P26 one has a frequency spread of $2.32 \times 10^{11}$ cps. or 4,640 modes. Mode locking in ordinary laboratory $CO_2$ lasers has available only two or three available modes within the gain frequency bandwidth. These modes have been made to lock passively using $SF_6$ as a saturable absorber. $SF_6$, sulfur hexafluoride, is a gas having an absorption coefficient which is initially high at $10.6\mu$ but may be quickly bleached out and made transparent. Active mode locking has been done using accoustically modulated gallium arsenide. An electric-driven shock-tube wind tunnel can provide a pulsed flow of expanded supersonic flowing gas into a test section at a 10 atmosphere or higher pressure. The fast flowing gas static temperature should be near 300° K. for lasing but must have a suitable electron density for good efficient MHD coupling to generate the required electric power for pumping laser levels.

Electron-ion recombination rates in flames seeded by traces of alkali metals are of the order of $1.5 \times 10^{-9}$ cm.$^3$/ion-sec. at one atmosphere. Gas pressure has little to do with recombination rates until the electron density is about $10^{-5}$ of the background gas density, then fast 3 body recombination collisions dominate. The average life of the free electrons at 2,000° K. and $10^{15}$/cm.$^3$ is $7 \times 10^{-6}$ seconds when cesium is present. In fast expanding nozzle flows the electron temperature throughout the entire flow is locked to the equilibrium stagnation chamber temperature because of the very high heat conductivity of an electron gas enabling a high electron temperature to coexist with 300° K. gases. These lifetime estimates are consistent with observed electron densities in MHD flows and further indicate that the required electron density exists when needed. If cesium (or other alkali metal) is absent the average electron lifetime would drop to $6 \times 10^{-6}$ seconds, a time too short to be of serious interest.

The effects of pressure are shown on the gain spectral profile for a constant number of $CO_2$ molecules in FIG. 2. Allowances were not made for the effects of pressure on frequency shift because this will not affect the operation. A partial plot of the total spectra is shown indicating the transition of P levels with increased pressure which allows mode locking to occur. Since a semi-log plot has a constant ratio property, a constant volume having the $CO_2$ molecular density being proportional to pressure makes the peaks of the curves fall on a constant set of points; hence, the peaks of curves A, B, C and D are aligned for all pressures. Increasing the pressure by adding laser molecules brings the peaks of curves B, C and D up to the peak of curve A, with the broadening remaining the same. At 20 atmospheres no clear line structure is apparent. It is very clear at lower pressures, however.

There are $c/2L$ longitudinal modes in a laser cavity of the above frequency separation. For a 50 cm. laser this is a frequency separation of 300 megacycles or $300 \times 10^6$. A $CO_2$ laser at 10 torr has a $\Delta\nu \approx 50 \times 10^6$ cps. This means that only a single mode is allowed under the gain spectral profile at a single time. As the pressure is increased to one atmosphere $\Delta\nu = 3.04 \times 10^9$ cps. The above given mode separation indicates that $3.04 \times 10^9/300 \times 10^6$ modes can exist under the gain curve, which is for a single P vibrational-rotation. These modes have been found to lock by use of either passive or active methods.

As shown in FIG. 2, with pressure increasing the gain spectral profile continues to broaden until it is possible to lock the modes of all adjacent vibrational-rotational transitions. As the pressure increases the width of the mode locked pulses decreases. It is approximately $10^{-9}$ sec. at 1 atmosphere and $10^{-10}$ sec. at 10 atmospheres. The output power from a mode-locked system in atmospheric air would be limited to $10^9$ watts/cm.$^2$.

The adiabatic process enhanced by the introduction of laser gas and hydrogen at the opening of the laser cavity, generates laser level pumping with chemical reactions in cavity 20. The MHD generator magnetic field allows direct-current electrical energy to be obtained from the ionized gases, as is well known in the art. This output energy is enhanced by the introduction of cesium, amplified and coupled to provide additional electrical pumping of the laser gas. Thus an improved self-pumped electroadiabatic laser is disclosed. The first input power pulses for electrical pumping result in an increase in efficiency of laser energy output pulses. Introducing the alkali metal compounds prior to MHD action allows maximum energy to be drawn from the ionized gas. To further enhance the electrical conductivity of the gas, compression section 32 between nozzle 30 and MHD generator 34 allows conversion of some of the directed translational kinetic energy to random kinetic energy of molecules, further heating up the gas and ionizing the cesium compounds.

While the invention has been described in connection with certain specific embodiments thereof, it will now be understood that other modifications will suggest themselves to those skilled in the art and it is intended to cover such modifications that fall within the scope of the claims appended hereto.

I claim:

1. A self pumped electro-adiabatic gas laser comprising: a combustion chamber having first and second input ports for receiving a laser and pumping gas respectively for mixing in a ratio to provide laser level excitation; a laser cavity coupled to said chamber for receiving gases expanding from said chamber and wherein lasing action can occur while said gases expand through the cavity; an electrical stimulation chamber coupled to said laser cavity for receiving exhausting laser gas; a magnetohydrodynamic generator for generating a magnetic field across the path of said gas passing through said stimulation chamber and extracting electrical energy therefrom; a direct current pulser coupled between said MHD generator and said laser cavity for discharging direct current feedback pulses through said cavity in response to the level of said extracted electrical energy; a plurality of input ports adjacent said laser cavity for injecting cold laser gas into said flowing gas to augment lasing action within said laser cavity, and a plurality of input ports adjacent said MHD magnetic field for injecting an alkali metal compound into the exhausting laser gas for enhancing ionization in the gas before it reaches the magnetic field and thereby enhancing the electrical energy available to said MHD generator.

2. A gas laser as set forth in claim 1 wherein said pulser is a Marks-Bank system for converting low voltage, direct current pulses into high voltage pulses and further comprising a compression chamber between said laser cavity and said MHD generator for compressing said gases and thermally enhancing ionization of the gas.

3. A gas laser as set forth in claim 2 wherein said alkali metal compound is cesium, said laser gas is carbon dioxide, and said pumping gases are nitrogen and chemically reacted fluorine and hydrogen gas.

4. In an electro-adiabatic gas laser having a conventional combustion chamber and nozzle for coupling expanding thermally excited, ionized gases into an adjacent laser cavity, a method for improving the self-pumped, electro-adiabatic lasing action, comprising the steps of:

mixing a laser and pumping gas for stimulating laser level excitation therein;

passing said gases through a laser cavity for extracting optical energy therefrom;

compressing said gases for enhancing thermal excitation and ionization thereof;

expanding said gases through a magnetic field for obtaining electrical energy pulses therefrom; and pumping said laser cavity with electrical power pulses derived from said flowing gases.

5. A method for improving lasing action as set forth in claim 4 and further comprising the steps of:

injecting a cold laser gas into said flowing ionized gases just prior to passing said gases through the laser cavity for enhancing laser level excitation therein;

injecting an alkali metal compound into said flowing gas before compression thereof for releasing electrons and enhancing ionization of the gas; and amplifying said electrical power pulses prior to pumping said laser cavity.

References Cited
UNITED STATES PATENTS 3,621,461  11/1971  Perkins _____ 331—94.5

WILLIAM L. SIKES, Primary Examiner